United States Patent
Komiya

(10) Patent No.: US 7,249,452 B2
(45) Date of Patent: Jul. 31, 2007

(54) CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/499,433

(22) Filed: Aug. 4, 2006

(65) Prior Publication Data

US 2007/0071544 A1 Mar. 29, 2007

(30) Foreign Application Priority Data

Sep. 29, 2005 (JP) .............................. 2005-285263

(51) Int. Cl.
*F16G 13/14* (2006.01)
*H02G 11/00* (2006.01)
(52) U.S. Cl. ........................... 59/78.1; 59/900; 248/49; 248/51
(58) Field of Classification Search ................. 59/78.1; 248/49, 51
See application file for complete search history.

(56) References Cited

U.S. PATENT DOCUMENTS 5,201,885 A * 4/1993 Wehler et al. ............... 59/78.1
5,243,814 A * 9/1993 Hart ............................ 59/78.1
5,778,656 A * 7/1998 Hart ............................ 59/78.1
6,789,383 B1 * 9/2004 Plush et al. .................. 59/78.1

FOREIGN PATENT DOCUMENTS

JP 3356699 5/2000

* cited by examiner

*Primary Examiner*—David B Jones
(74) *Attorney, Agent, or Firm*—Woodling, Krost & Rust

(57) ABSTRACT

The object of the instant invention is to provide a cable (or the like) protection and guide device in which inadvertent disengagement during operation can be avoided. Engagement between an opening/closing arm and link plates is accomplished by a dual mechanism locking structure. Easy engagement during use allows for excellent durability. The dual locking structure exhibits adequate strength even in smaller scale versions. The cable protection and guide device contains a plurality of link bodies with each link body comprises one link plate and another (110, 110). The link bodies are flexibly connected to each other. Each link body includes a connecting arm (120), an opening/closing arm (130), a hinge connection mechanism (100A), a main locking mechanism (100B), and an auxiliary locking mechanism (100C). A main locking mechanism (100B) secures the opening/closing arm (130) and the link plates (110, 110). An auxiliary locking mechanism (100C) locks the opening/closing arm (130) and the link plates (110, 110).

16 Claims, 8 Drawing Sheets

CABLE OR THE LIKE PROTECTION AND GUIDE DEVICE

TECHNICAL FIELD

The present invention relates to a cable or the like protection and guide device which safely and reliably protects and guides a flexible body such as an electric cable or a hose which supplies a movable machine with energy. More specifically, the present invention relates to a cable or the like protection and guide device comprising a plurality of link bodies flexibly connected to each other. Each link body comprises one link plate and another link plate, a connecting plate, and an opening/closing arm. The connecting arm connects the respective lower edges of the link plates. The opening/closing arm is connected to the respective upper edges (upper portions) of the link plates.

BACKGROUND TECHNOLOGY

The cable or the like protection and guide device comprises link bodies flexibly connected to adjacent link bodies. The front end of each link body is flexibly connected to the respective rear end of an adjacent link body. One end of the cable or the like protection and guide device is attached to a movable machine and the other end thereof is attached to a fixed frame or a floor surface. Each link body has a hollow space inside the link body. Further, a flexible body such as a cable, a hose, or the like is accommodated in the hollow space of the continuous link bodies. Energy is supplied to the movable machine from the floor surface.

One example of the cable or the like protection and guide device comprises a plurality of flexibly connected link bodies. Each link body has a pair of right and left link plates, a connecting arm, and an opening/closing arm. Sometimes herein the right link plate is referred to as one link plate and the left link plate is referred to as the other link plate or "another link plate". The connecting arm connects the respective lower edges of the link plates. The upper portion of one of the link plates of each link body includes a hinge pivotably connected to a first end of the opening/closing arm.

An engagement pin is provided in an upper portion of the other link plate. The engagement pin is engageable with an engagement piece on the second end of the connecting arm. The engagement pin extends in the longitudinal direction of the chain. The chain is located in the hollow space inside of the connected link bodies. An engagement piece inserts into and is slidably movable along the opening/closing arm. One end of the engagement piece slidably interconnects with the second end of the opening/closing arm. The other end of the engagement piece has an engagement pin insertion groove which extends in the longitudinal direction of the link plate. The first end of the opening/closing arm is pivoted about an end of the hinge which resides in the upper portion of the link plate. The engagement piece is movable along the opening/closing arm so that the engagement pin may be engaged with the engagement pin insertion groove. See for example Patent Reference 1. Patent Reference 1 is Japanese Patent Publication No. 3356699.

Problems to be Solved by the Invention

In a conventional cable or the like protection and guide device, an upper end portion of a link plate and the end of an opening/closing arm are fixed to each other by an engagement structure. The engagement structure consists of an engagement pin insertion groove in an engagement piece movable along the opening/closing arm. As a result when both elements are not reliably fixed to a required engagement position due to insufficient positioning there are problems. One serious problem that may occur is the easy disengagement by vibration or the like during operation. This can lead to a serious failure in engagement. Further, when members forming the engagement structure break, the other end of the opening/closing arm cannot be fixed to the upper end portion of the other link plate and the opening/closing arm is separated. Additionally, when the engagement piece that is movable along the opening/closing arm is lost, the opening/closing arm is not used.

Further, when an upper end portion of the other link plate and the other end of an opening/closing arm are fixed to each other by only one engagement structure such as an engagement pin insertion groove in an engagement piece other problems may occur. For example, when the cable (or the like) is heavy, the large load applied to the engagement structure can result in significant loss of endurance throughout the entire structure. Further, there is a problem that the size of the engagement structure has limitations due to strength requirements. As a result, miniaturization of the entire device with sufficient strength cannot be achieved.

Accordingly, the object of the present invention is to solve the above-mentioned problems and to provide a cable or the like protection and guide device in which inadvertent disengagement during operation can be avoided by making the engagement between an opening/closing arm and link plates reliable and strong. It is an additional object of the invention to provide a structure with a dual locking mechanism. Easy engagement operation and excellent endurance are achieved.

SUMMARY OF THE INVENTION

Means for Solving the Problems

First, the invention solves the above-mentioned problems with a cable or the like protection and guide device in which a plurality of link bodies are flexibly connected to each other. Each link body is comprised of a pair of right and left link plates, a connecting arm, an opening/closing arm, and a hinge connecting mechanism. The connecting arm connects the lower edges of the link plates to each other. The opening/closing arm connects the upper portions of the link plates to each other. The opening/closing arm is comprised of a first end and a second end. The hinge connecting mechanism openably pivots the opening/closing arm and is located at an upper end portion of one of the link plates. The hinge connecting mechanism is pivotably interconnected with the first end of the opening/closing arm.

The cable or the like protection and guide device is characterized in having both a main locking mechanism and an auxiliary locking mechanism. The main locking mechanism secures the opening/closing arm to one of the link plates. This main locking mechanism is also capable of disengaging the opening/closing arm from the link plate. The main locking mechanism comprises an engagement pin and an engagement piece. The engagement pin is integrally molded in an upper end portion of the other link plate and extends in the longitudinal direction of the chain. The engagement piece is attached to the second end of the opening/closing arm and is movable from the outside toward the inside of the other link plate along the opening/closing arm. The engagement piece when opened exposes an engagement pin insertion groove which receives the engagement pin. The engagement pin and the engagement pin insertion groove extend in the longitudinal direction of the opening/closing arm. The auxiliary locking mechanism locks the opening/closing arm and the link plate.

The auxiliary locking mechanism comprises a protrusion piece insertion groove and an auxiliary protrusion piece. The protrusion piece insertion groove is integrally molded in the other link plate sometimes described herein as "another" link plate in the vicinity of an end portion of the engagement pin and opens toward the inside of the link plate. The auxiliary protrusion piece is integrally molded on the second end of the opening/closing arm and is engageably inserted from the inside toward the outside of the other link plate.

The cable or the like protection and guide device further solves the above-mentioned problems with a guide surface. The guide surface guides the auxiliary protrusion piece to an insertion start position of the protrusion piece insertion groove by allowing the auxiliary protrusion piece to slide along its surface. The guide surface is integrally formed in the other link plate in the vicinity of the end portion of the engagement pin.

Further, the cable or the like protection and guide device further solves the above-mentioned problems with a locking tongue piece, which cooperates with the engagement pin insertion groove in the engagement piece to hold the engagement pin. The locking tongue piece is integrally formed in the opening/closing arm and is in the vicinity of the auxiliary protrusion piece.

Further, the cable or the like protection and guide device further solves the above-mentioned problems with a hinge connecting mechanism comprised of a second engagement pin and an engagement pin insertion groove. The engagement pin is integrally molded on an upper end portion of the other link plate and extends in the longitudinal direction of the chain. The engagement pin insertion groove is formed on an end of the engagement piece slidably interconnected with the opening/closing arm. The engagement pin insertion groove is open from an inner peripheral side of the link plate toward an outer peripheral side thereof. This allows the engagement pin insertion groove to engage with the second engagement pin.

Further, the cable or the like protection and guide device solves the above-mentioned problems by providing an elastic deformable locking tongue part and at least one stopper portion. The deformable locking tongue part is integrally molded in the engagement piece. The stopper portion is also integrally molded and is located in the opening/closing arm. The stopper portion interengages and locks the locking tongue part. The locking tongue part is locked by the stopper portion to block movement of the engagement piece when the engagement pin insertion groove of the engagement piece is moved to engage the engagement pin. In this way the engagement remains interconnected to the engagement pin.

Effects of the Invention

The cable or the like protection and guide device of the invention includes a main locking mechanism which disengageably secures the opening/closing arm and the other link plate. An auxiliary locking mechanism also disengageably locks the opening/closing arm and the other link plate. The engagement between the opening/closing arm and the other link plate is performed by dual locking engagement mechanisms. A load, which acts on the opening/closing arm is distributed between both the main locking mechanism and the auxiliary locking mechanism. Excellent endurance of the device can be achieved. Additionally, even if the main locking mechanism is disengaged during operation the auxiliary mechanism is still engaged and inadvertent disengagement of the opening/closing arm during operation is avoided. As a result, reliable engagement and disengagement of the opening/closing arm can be realized. Additionally, the following peculiar effects can be obtained.

The main locking mechanism comprises an engagement pin and an engagement piece. The engagement pin is integrally molded in an upper portion of the other link plate and extends in the longitudinal direction of the chain. The engagement piece is slidably attached to the second end of the opening/closing arm and is movable from the outside toward the inside of the link plate along the opening/closing arm. The engagement piece when opened reveals an engagement pin insertion groove engageable with the engagement pin. The engagement piece moves in the direction of the opening/closing arm. The pivoting direction of the opening/closing arm and the direction of movement of the engagement piece are different from each other. Thus, as long as the engagement piece has engaged the engagement pin and the protrusion piece is inserted into the protrusion piece insertion groove, the opening/closing arm is not inadvertently disengaged from the link plate. Further, since the engagement pin insertion groove in the engagement piece is moved from the outside toward the inside of the link plate to engage with an engagement pin, the engagement operation for engagement securing the opening/closing arm to the link plate becomes easy and the efforts of operation can be reduced.

The auxiliary locking mechanism comprises a protrusion piece insertion groove and an auxiliary protrusion piece. The protrusion piece insertion groove is integrally molded in the other link plate and in the vicinity of an end portion of the engagement pin. The opening of the protrusion piece insertion groove faces the inside of the link plate. An auxiliary protrusion piece is integrally molded on the second end of the opening/closing arm and is engageably inserted into the protrusion piece insertion groove from the inside toward the outside of the other link plate. When the auxiliary protrusion piece is inserted into the protrusion piece insertion groove, sandwiching pressure from both right and left link plates acts on the auxiliary protrusion piece. Thus, an insertion state of the auxiliary protrusion piece into the protrusion piece insertion groove is reliable and stable. The strength of the auxiliary lock mechanism allows miniaturization to be attained without compromising the strength or endurance of the device. Further, even if the main locking mechanism does not work, the opening/closing arm does not disengage from the link plate and torsional rigidity of the entire link body is significantly improved.

Further, a guide surface is integrally formed in the vicinity of the end portion of the engagement pin. The guide surface positions the auxiliary protrusion piece for entry into the protrusion piece insertion groove. Force is applied to the opening/closing arm and the gap between the right and left link plates is widened. Or, put another way, the gap between the link plate and the other link plate is increased. The protrusion piece is guided along the guide surface which allows the auxiliary protrusion piece to slide into place within the protrusion piece insertion groove. As a result, the engagement operation load is reduced.

Further, a locking tongue piece cooperates with the engagement pin insertion groove in the engagement piece to hold the engagement pin. The locking tongue piece is integrally formed in the vicinity of the auxiliary protrusion piece. The opening/closing arm is reliably locked with an engagement pin so that the opportunity for inadvertent disengagement can be significantly reduced.

Additionally, the hinge connecting mechanism is comprised by a second engagement pin and an engagement pin insertion groove. The second engagement pin is integrally molded in an upper end portion on the link plate denoted one link plate and extends in the longitudinal direction of a chain. The engagement pin insertion groove formed on the second end of the engagement piece is open in the inner peripheral side thereof. The engagement pin insertion groove can be engaged with the second engagement pin when the auxiliary locking mechanism is engaged. The opening direction of the engagement pin insertion groove formed on the end of the engagement piece slidably attached to the opening/closing arm is different from the opening direction of the protrusion piece insertion groove of the auxiliary locking mechanism.

That is, to unlock the main locking mechanism the engagement piece is extended outwardly from the other link plate. To unlock the auxiliary protrusion piece it must be moved inwardly with respect to the other link plate. Thus, even if an opening/closing arm side auxiliary protrusion piece is intentionally pulled out of a link plate side protrusion piece insertion groove, the opening/closing arm still does not inadvertently disengage from the link plate. And even though the auxiliary locking mechanism is a simple engagement structure, it can exhibit reliable engagement force by itself.

Additionally, a cable or the like protection and guide device further comprises an elastic deformable locking tongue part and at least one stopper portion. The elastic deformable locking tongue part is integrally molded in the engagement piece. At least one stopper portion is integrally molded in the opening/closing arm and locks the locking tongue part. The locking tongue part is locked by one stopper portion to block movement of the engagement piece in direction away from the engagement pin when the engagement pin insertion groove in the engagement piece is moved to engage the engagement pin. The locking tongue part and the stopper portion block the movement of the engagement piece. The locking tongue part and the stopper block the movement of the engagement piece by elastic deformation of the locking tongue part. Thus, when the second end of the opening/closing arm is engaged with an engagement pin or the second end of the opening/closing arm is disengaged from the engagement pin, large force is not needed and the assembling and disassembling of the opening/closing arm can be easily achieved.

The present invention is a cable or the like protection and guide device in which a plurality of link bodies are flexibly connected to each other. Each link body comprises a pair of right and left link plates, a connecting arm, an opening/closing arm, and a hinge connecting mechanism. The link bodies are flexibly connected to each other. The connecting arm connects the lower edges of the link plates to each other. The opening/closing arm connects the upper edges or upper portions of the link plates to each other. The hinge connecting mechanism openably pivots the opening/closing arm. The opening/closing arm includes a first end portion which pivots about a hinge in one link plate. The opening/closing arm includes a second end portion which interlocks with the other link plate.

The cable or the like protection and guide device is characterized by a main locking mechanism and an auxiliary locking mechanism. Both locking mechanisms secure the link plates together. The main locking mechanism includes an engagement pin and an engagement piece. The engagement pin (sometimes referred to herein as the first engagement pin) is integrally molded in an upper end portion of the other link plate and extends in the longitudinal direction of a chain. The engagement piece is attached to the second end of the opening/closing arm and is movable from the outside toward the inside of the link plate along the opening/closing arm. To lock the opening/closing arm the engagement piece is moved from the outside toward the inside of the link plate. To unlock the opening/closing arm the engagement piece is moved away from the other link plate. The engagement piece opens an engagement pin insertion groove engageable with the engagement pin in the longitudinal direction of the opening/closing arm. An auxiliary locking mechanism disengageably locks the opening/closing arm and the other link plate. The auxiliary locking mechanism comprises a protrusion piece insertion groove and auxiliary protrusion piece. The protrusion piece insertion groove is integrally molded in the vicinity of an end portion of the engagement pin and opens toward the inside of the other link plate. The auxiliary protrusion piece is integrally molded on the second end of the opening/closing arm and is engageably inserted from the inside toward the outside of the link plate. The present invention avoids inadvertent disengagement during operation by making the engagement between the opening/closing arm and the link plate reliable and strong. The present invention includes a dual locking engagement mechanism. The cable or the like protection and guide device can perform an easy engagement operation and exhibit excellent endurance even if miniaturized. Additional concrete embodiments of the invention may be used.

It is noted that in the present invention the engagement piece is slidably attached to the opening/closing arm. The main locking mechanism may be formed with one end engagement piece slidably attached to the second end of the opening/closing arm. The slidable engagement piece can also be attached to the first end of the opening/closing arm to form the main locking mechanism. In this case, the structure of the opening/closing arm becomes symmetrical on both ends thereof and no attention is needed for an attachment direction of the opening/closing arm during assembly. Thus, the slidable engagement piece can be engaged and disengaged from the first end and the second end of the opening/closing arm, and it is needless to say that engagement and disengagement workability is further improved.

DESCRIPTION OF THE INVENTION

EXAMPLE

A cable or the like protection and guide device, which is one example of the present invention, will be described with reference to drawings.

Figure 1:
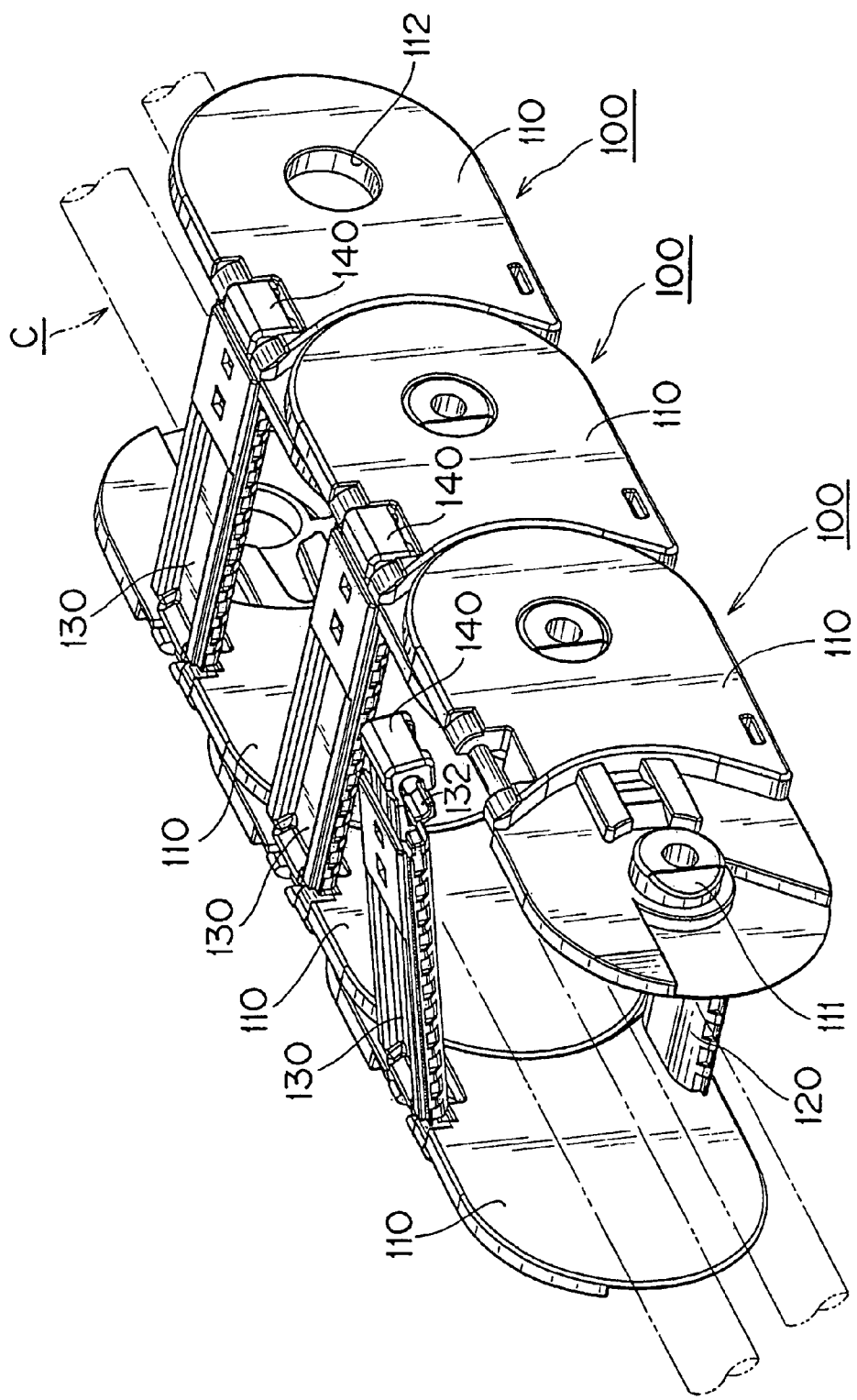
FIG. 1 is a schematic view of a cable or the like protection and guide device, which is one example of the present invention.
Figure 2:
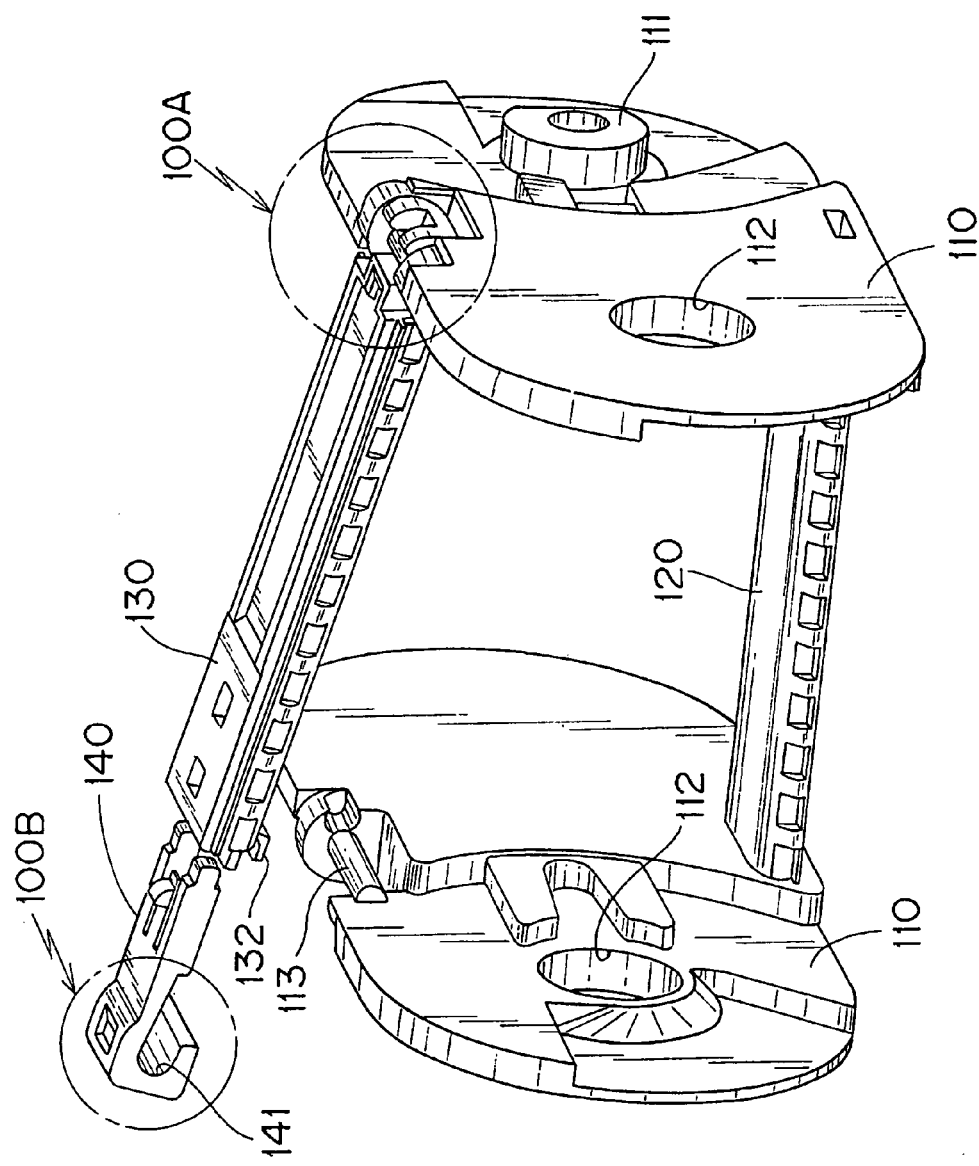
FIG. 2 is an entire view of the link body shown in FIG. 1.
Figure 3:
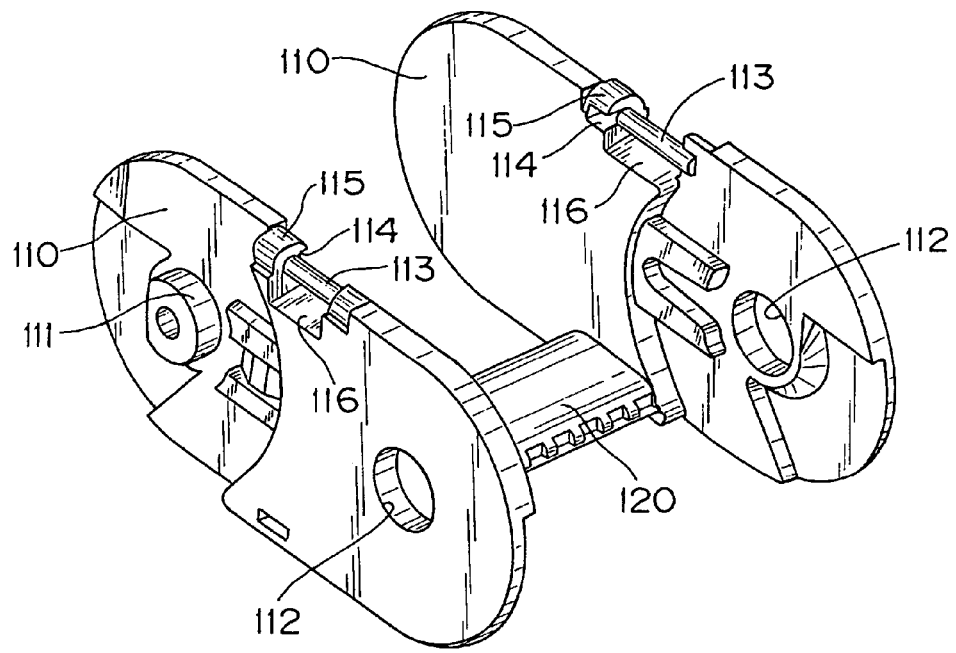
FIG. 3 is a perspective view showing a connecting state between a link plate and a connecting arm.
Figure 4:
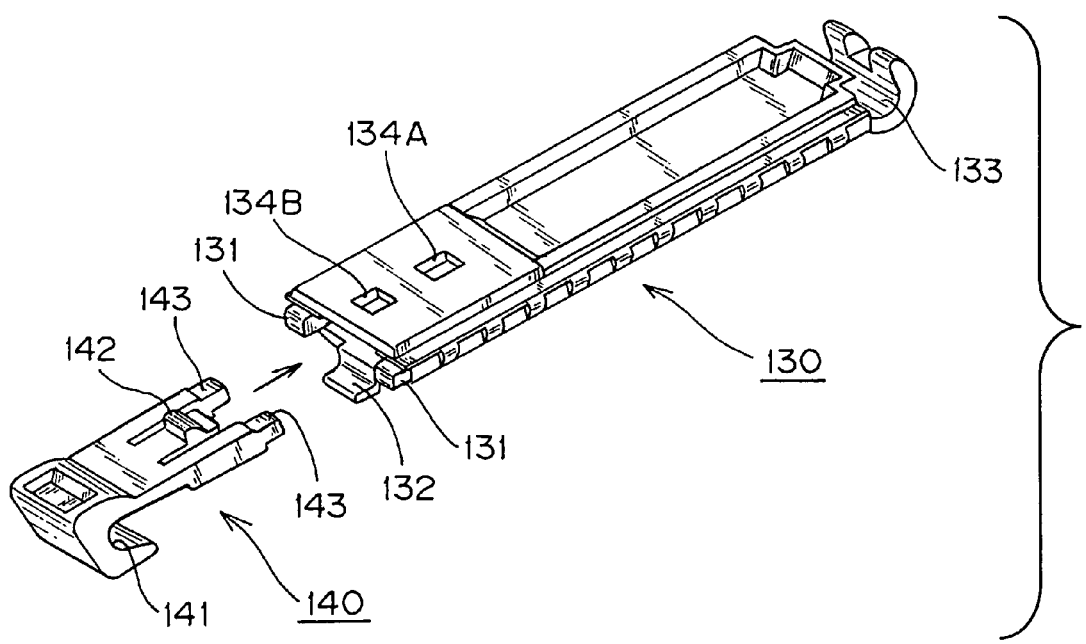
FIG. 4 is an exploded view of the opening/closing arm and the engagement piece.
Figure 5:
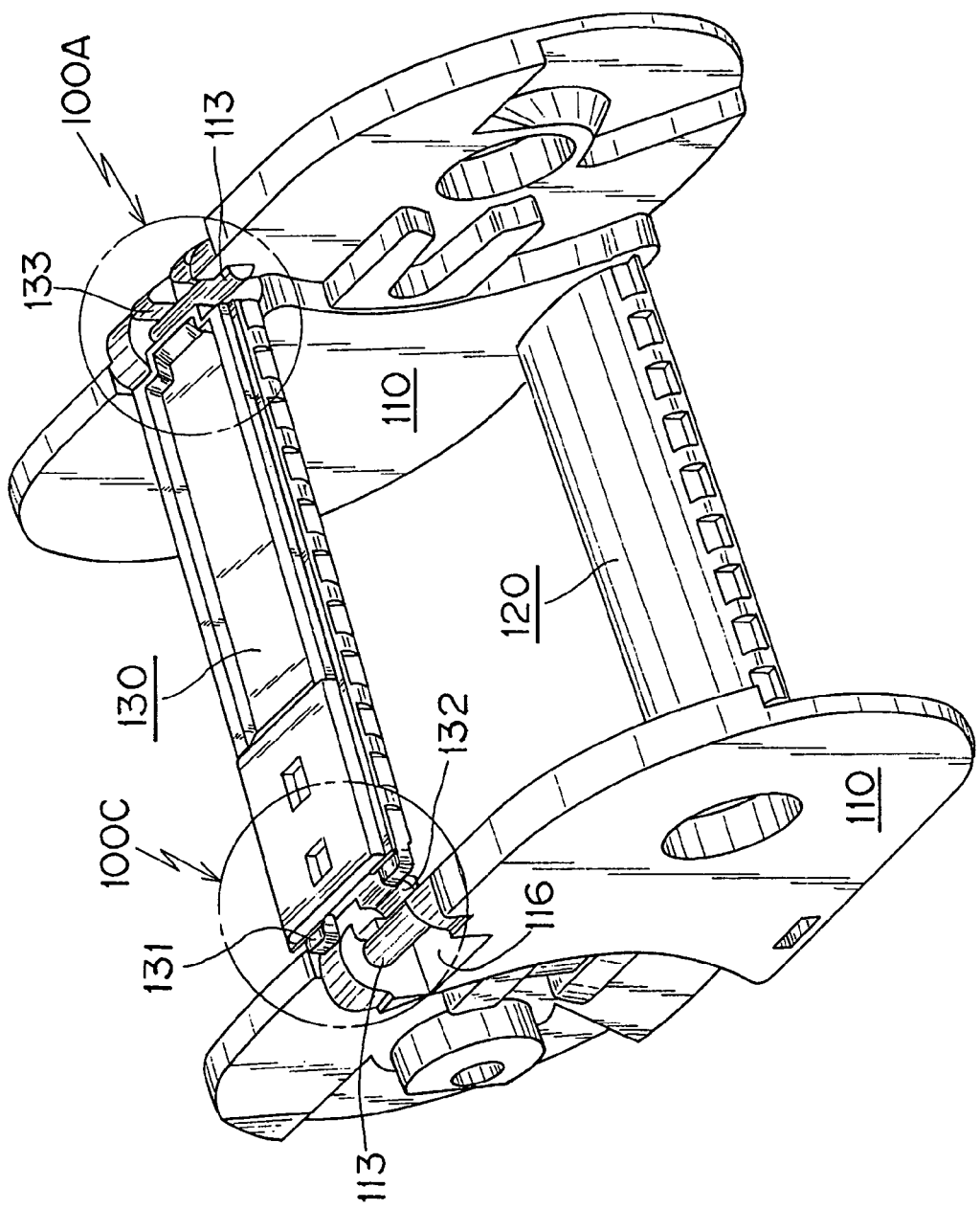
FIG. 5 is a perspective view showing a state where an opening/closing arm is locked by only an auxiliary locking mechanism.
Figure 6:
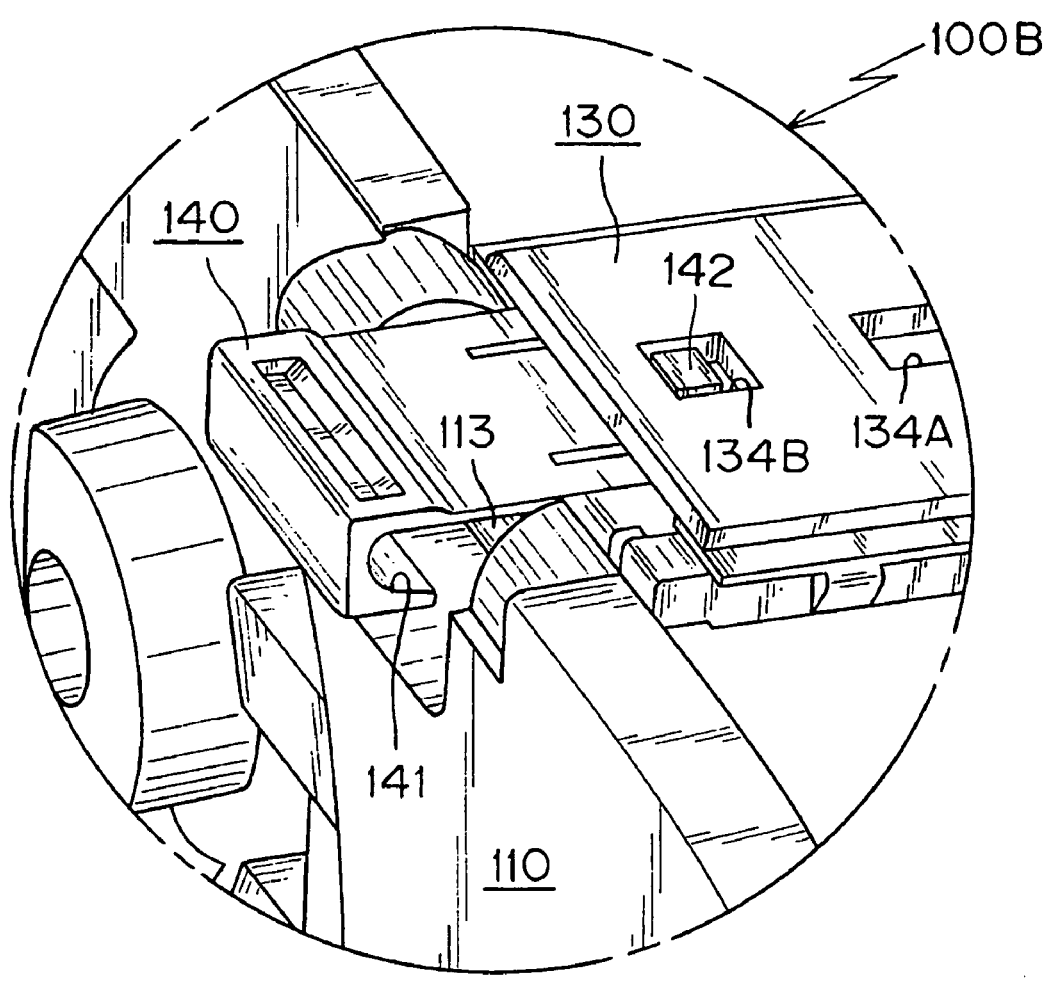
FIG. 6 is an enlarged perspective view showing a securing starting state of a main locking mechanism.
Figure 7:
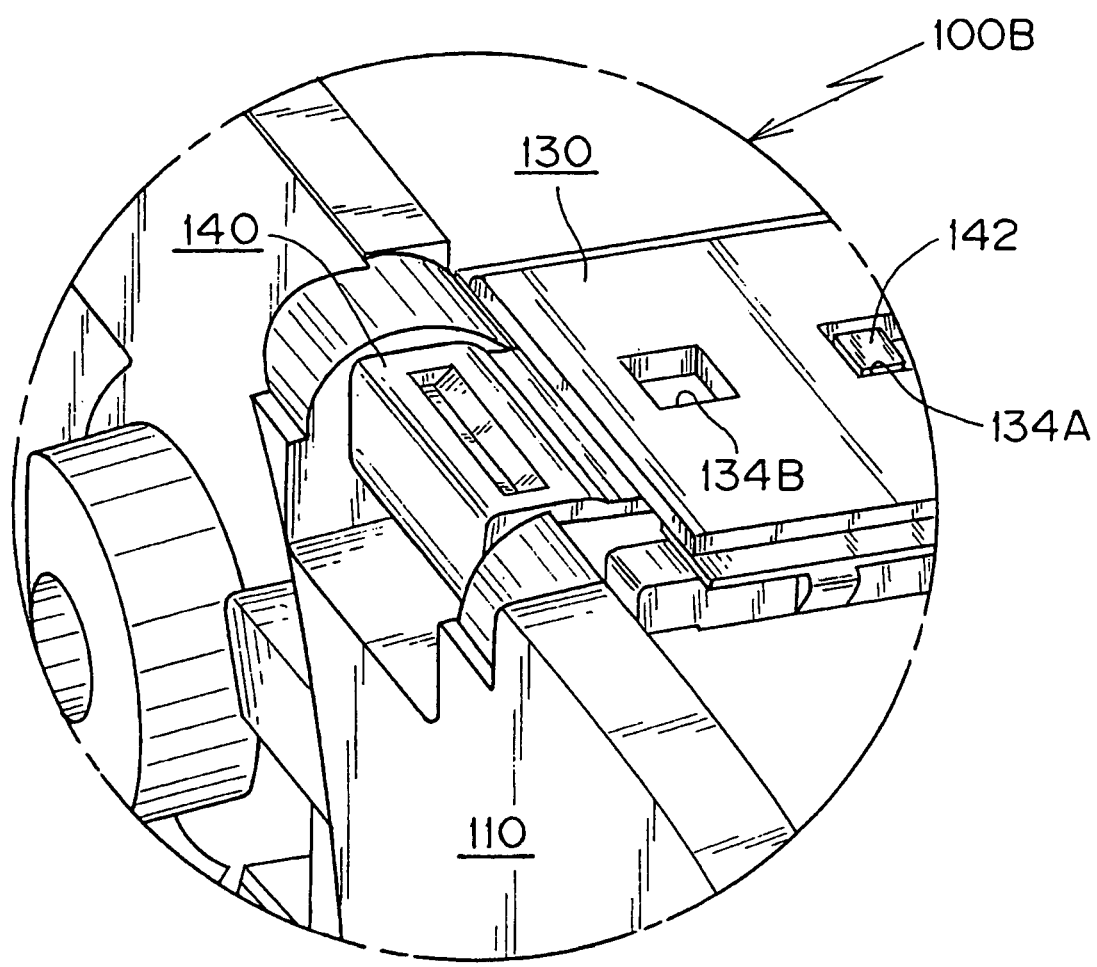
FIG. 7 is an enlarged perspective view showing a securing completion state of the main locking mechanism.
Figure 8:
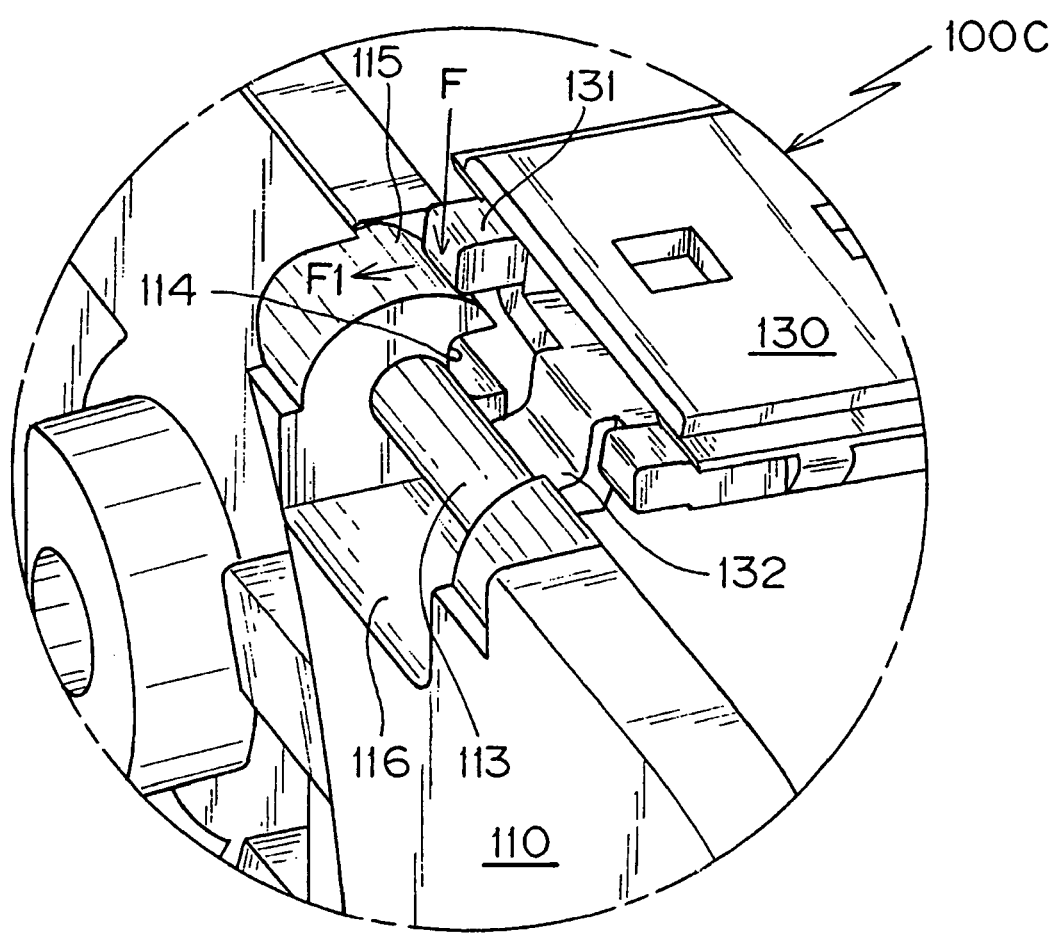
FIG. 8 is an enlarged perspective view showing a locking starting state of an auxiliary locking mechanism.
Figure 9:
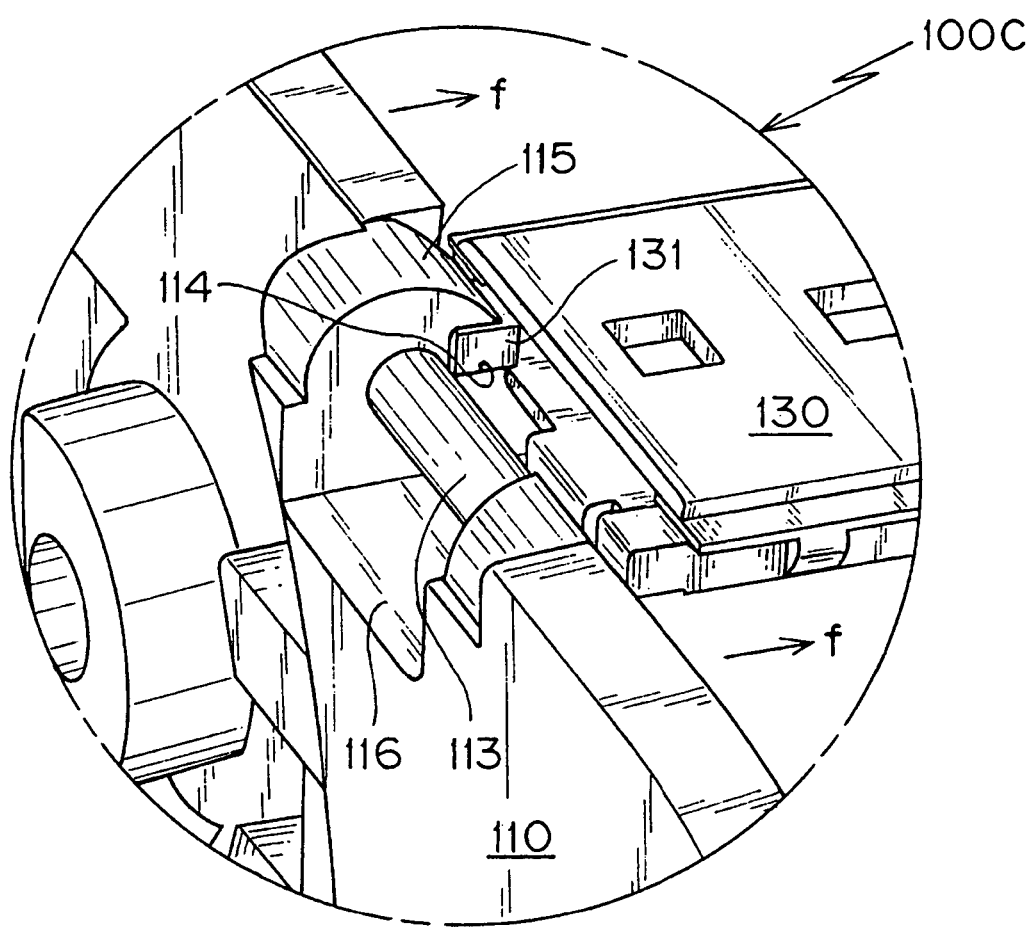
FIG. 9 is an enlarged perspective view showing a locking completion state of the auxiliary locking mechanism.

First, FIG. 1 is a schematic view of a cable or the like protection and guide device, which is one example of the present invention. FIG. 2 is an entire view of a link body shown in FIG. 1. FIG. 3 is a perspective view showing a connection state between link plates and a connecting arm. FIG. 4 is an exploded view of an opening/closing arm and an engagement piece. FIG. 5 is a perspective view showing a state where an opening/closing arm is locked by only an auxiliary locking mechanism. FIG. 6 is an enlarged perspective view showing a securing starting state of a main locking mechanism. FIG. 7 is an enlarged perspective view showing a securing completion state of the main locking mechanism. FIG. 8 is an enlarged perspective view showing a locking starting state of an auxiliary locking mechanism. FIG. 9 is an enlarged perspective view showing a locking completion state of the auxiliary locking mechanism.

The cable or the like protection and guide device, which is one example of the present invention shown in FIG. 1 includes a plurality of link bodies 100, and a longitudinal end of the connected link bodies is attached to a movable machine (not shown) and the other end of the connected link bodies is attached to a floor surface (not shown).

The link body 100 includes, as shown in FIG. 2, one link plate and another link plate 110, 110, a connecting arm 120, which connects lower end portions (lower edges) of the respective link plates 110, 110, and an opening/closing arm 130, which connects upper end portions of the respective link plates 110, 110. It is noted that the reference numeral 111 in FIGS. 1 and 2 denote a connecting pin, which connects the link plates 110 to each other in the longitudinal direction, and the reference numeral 112 denotes a connecting hole for the connecting pin, which connects the link plates 110 to each other in the longitudinal direction, to flexibly fit into the connecting hole.

Further, the link body 100 is injection-molded of a resin material as shown in FIGS. 2 and 3. The connecting arm 120 is integrally molded together with oval-shaped link bodies 110, and the opening/closing arm 130 is disengageably formed on the link plate 110 so that a cable or the like C composed of a flexible body such as a cable, a hose or the like is accommodated into the link body 100.

The link body 100 includes a hinge connecting mechanism 100A in FIG. 2, a main locking mechanism 100B in FIG. 2, and an auxiliary locking mechanism 100C in FIG. 5. The hinge connecting mechanism 100A in FIG. 2, openably pivots the opening/closing arm 130. The hinge connection mechanism is formed in an upper end portion of one of the link plates 110. The first end of the opening/closing arm 130 pivotably engages the hinge portion. A main locking mechanism 100B in FIG. 2 is formed between the upper end portion of the other link plate, and the second end of the opening/closing arm 130 to disengageably secure the opening/closing arm 130 and the other link plate 110. An auxiliary locking mechanism 100C in FIG. 5 is formed between the upper end portion of the other link plate 110 and the second end of the opening/closing arm 130 to disengageably lock the opening/closing arm 130 and the link plate 110.

Since the cable or the like protection and guide device of the example includes the main locking mechanism 100B and the auxiliary locking mechanism 100C, the engagement between the opening/closing arm 130 and the link plate 110 has dual locking engagement mechanisms, and a load, which acts on the opening/closing arm 130 is distributed between the two structures: the main locking mechanism 100B and the auxiliary locking mechanism 100C. And even if the main locking mechanism 100B is disengaged from the other link plate 110 during operation, the auxiliary locking mechanism 100C is still engaged as shown in FIG. 9.

Thus, the main locking mechanism 100B, the auxiliary locking mechanism 100C, and the hinge connecting mechanism, respectively formed between the link plates 110 and the opening/closing arm 130 are characterized portions of the cable or the like protection and guide device of the example and are described in detail below.

First, the main locking mechanism 100B comprises, as shown in FIG. 2 or FIG. 6, an engagement pin 113 and an engagement piece 140. The engagement pin 113 is integrally molded in an upper end portion of the other link plate and extends in the longitudinal direction of a chain. Engagement pin 113 is sometimes referred to herein as the first engagement pin. The engagement piece 140 is slidably attached to the second end of the opening/closing arm 130. The engagement piece is slidably movable along the longitudinal direction of the opening/closing arm. The engagement piece 140 may be moved from the outside toward the inside of the other link plate 110 along the opening/closing arm 130 to lock the arm and the engagement pin insertion groove 141 is engaged with the engagement pin 113. As a result, the opening/closing arm 130 and the link plate 110 can be disengageably secured.

And as shown in FIG. 7, the pivoting direction of the opening/closing arm 130 and the movement direction of the engagement piece 140 are different from each other. When the engagement pin 113 is engaged with the engagement pin insertion groove 141 of the engagement piece 140, the opening/closing arm 130 is not inadvertently disengaged from the link plate 110. Further, since the engagement pin insertion groove 141 in the engagement piece 140 is moved from the outside toward the inside of the other link plate 110 to engage with an engagement pin 113, the engagement operation for engagement securing the opening/closing arm 130 to the link plate 110 becomes easy and the efforts to operate this device can be reduced.

Additionally, the auxiliary locking mechanism 100C comprises, as shown in FIG. 8, a protrusion piece insertion groove 114 and an auxiliary protrusion piece 131. The protrusion piece insertion groove 114 is integrally molded in the vicinity of an end portion of the engagement pin 113 and opens toward the inside of one link plate 110. The auxiliary protrusion piece 131, is integrally molded on the second end of the opening/closing arm 130 and is engageably inserted into the protrusion piece insertion groove 114 from the inside toward the outside of the link plate 110. When the auxiliary protrusion piece 131 is inserted into the protrusion piece insertion groove 114, the opening/closing arm 130 and the link plate 110 are disengageably locked.

And as shown in FIG. 9, when the auxiliary protrusion piece 131 is inserted into the protrusion piece insertion groove 114, sandwiching pressure is generated, from both side walls of a pair of right (other)and left (another) link plates 110, 110 so that the auxiliary protrusion piece 131 falls inside the protrusion piece insertion groove 114. Thus, an insertion state of the auxiliary protrusion piece 131 into the protrusion piece insertion groove 114 becomes reliable and strong. The miniaturization of the auxiliary locking mechanism 100C can be achieved. Further, even if the main locking mechanism 100B does not work, the opening/ closing arm 130 does not disengage from the upper end portion of the other link plate 110 and torsional rigidity of the entire link body 100 can be significantly improved.

Further, as shown in FIG. 8, a guide surface guides the auxiliary protrusion piece 131 by allowing the auxiliary protrusion piece 131 to slide to an insertion start position in the protrusion piece insertion groove 114. The guide surface is integrally formed in the vicinity of the end portion of the engagement pin 113. Force F pushes the other end of the opening/closing arm 130 into the link plate 110 from an upper end portion of the link plate 110 so as to engage both elements. Component F1 of the force widens the gap between a pair of right and left link plates 110, 110 in the guide surface 115. Component F1 smoothly slides an auxiliary protrusion piece 131 in the opening/closing arm 130 on a guide surface 115 to easily guide the auxiliary protrusion piece 131 to an insertion starting position of the protrusion piece insertion groove 114. As a result, the engagement operation load can be reduced.

Further, as shown in FIG. 1 or FIG. 2, a locking tongue piece 132, which cooperates with the engagement pin insertion groove 141 in the engagement piece 140 to hold the engagement pin 113, is integrally formed in the vicinity of the auxiliary protrusion piece 131. When the main locking mechanism 100B is operated, the opening/closing arm 130 is reliably locked to an engagement pin 113 so that the chance of inadvertent disengagement can be greatly reduced.

Further, when the other end of the opening/closing arm 130 is pushed into the link plate 110 from the upper end portion of the link plate 110 to engage both elements and the auxiliary locking mechanism 100C is operated, the locking tongue piece 132 abuts on a positioning contact surface 116. The positioning contact surface 116 is integrally molded on the upper end portion of one link plate 110 to reliably position an insertion starting position of the auxiliary protrusion piece 131 for insertion into the protrusion piece insertion groove 114. Thus, a reliable and easy engagement operation of the auxiliary locking mechanism 100C is attained.

Further, as shown in FIG. 5, the hinge connecting mechanism 100A comprises a second engagement pin 113 and an engagement pin insertion groove 133. The engagement pin 113 is integrally molded in an upper end portion of one link plate 110 (i.e. the right link plate) and extends in the longitudinal direction of the chain. The engagement pin insertion groove 133 is formed on the first end of the opening/closing arm 130. The engagement pin insertion groove 133 is opened from an inner peripheral side of the link plate 110 toward an outer peripheral side thereof.

Referring to FIG. 3 and FIG. 4, engagement insertion groove 133 is interlocked with engagement pin 113 by hooking the insertion groove 133 to pin 113 and then rotating opening/closing arm 130 into place. In this way, opening/closing arm 130 is restrained with respect to the pin 113.

When the auxiliary locking mechanism 100C is in an engagement state, the engagement pin insertion groove 133 has a U-shaped side cross-section engageable with the engagement pin 113. When the auxiliary locking mechanism 100C is locked the opening direction of the engagement pin insertion groove 133 which is formed on the first end of the opening/closing arm of the hinge connecting mechanism is different from the opening direction of the protrusion piece insertion groove 114 of the other link plate forming the auxiliary locking mechanism 100C. Thus, if the auxiliary protrusion piece 131 is intentionally pulled out of the other link plate 110 protrusion piece insertion groove 114, the opening/closing arm 130 still does not inadvertently disengage from the link plate 110. And even though the auxiliary locking mechanism 100C is a simple engagement structure it can exhibit reliable engagement force.

Additionally, the main locking mechanism 100B comprises, as shown in FIG. 4, an elastic deformable locking tongue part 142 and stopper portions, 134A and 134B. Elastic deformable locking tongue part 142 is integrally molded in the engagement piece 140. Stopper portions 134A and 134B are integrally molded in the opening/closing arm 130. The locking tongue part 142 is locked by the stopper portion 134A to block a movement of the engagement piece 140 in the opposite direction when the engagement pin insertion groove 141 in the engagement piece 140 is moved to engage the engagement pin 113. By opposite direction, it is meant the outward direction away from the other link plate 110 to open the engagement piece 140 and expose the engagement pin insertion groove 141. The locking tongue part 142 and the stopper portion 134A, block the movement of the engagement piece 140, and exhibit a slight locking state of such an extent that they can block the movement of the engagement piece 140 by elastic deformation of the locking tongue part 142. Thus, when the second end of the opening/closing arm 130 is engaged with engagement pin 113 or the second end of the opening/closing arm 130 is disengaged from the engagement pin 113, large force is not needed and the assembling and disassembling of the opening/closing arm 130 can be easily attained.

It is noted that the reference numbers 143 shown in FIG. 4 denote a pair of right and left guide pieces disposed in parallel with the locking tongue part 142 for the engagement piece 140 to move in the longitudinal direction of the opening/closing arm 130.

Further, when the locking tongue part 142 in the engagement piece 140 and the stopper portion 134A in the opening/closing arm 130 are disengaged, the stopper portion 134B shown in FIG. 4 prevents the engagement piece 140 from separating from the opening/closing arm 130, as shown in FIG. 6.

In the present example, the engagement piece 140 attached to the opening/closing arm 130 is mounted on only the second end of the opening/closing arm 130 to form the main locking mechanism 100B. However, the opening/closing arm 130 may be connected by attaching an engagement piece 140 to the first end of the opening/closing arm 130 so that the main locking mechanism 100B is formed. In this case, the structure of the opening/closing arm 130 becomes symmetrical on both ends thereof and no attention is needed for an attachment direction of the opening/closing arm 130 during assembly. Thus, the opening/closing arm 130 can be engaged and disengaged from the first end and the second end of the opening/closing arm 130. Engagement and disengagement workability is further improved.

The thus obtained cable or the like protection and guide device of this example includes a main locking mechanism 100B and an auxiliary locking mechanism 100C. The main locking mechanism 100B disengageably secures an opening/closing arm 130 and a link plate 110 referred to herein as the other link plate. The auxiliary locking mechanism 100C, disengageably locks them. The engagement between the opening/closing arm 130 and the link plate 110 is performed by a dual locking mechanism. A load, which acts on the opening/closing arm 130 is distributed between the main locking mechanism 100B and auxiliary mechanism 100C so that excellent endurance of the device can be exhibited. Even if the main locking mechanism 100B is disengaged during operation, since the auxiliary mechanism 100B is still engaged, inadvertent disengagement of the opening/closing arm 130 during operation is avoided. As a result, reliable engagement and disengagement are realized. Additionally, miniaturization of the cable or the like protection and guide device of this invention can also be achieved. Thus, the effects of the present invention are very significant.

DESCRIPTION OF REFERENCE NUMERALS

100 . . . Link plate
100A . . . Hinge connecting mechanism
100B . . . Main locking mechanism
100C . . . Auxiliary locking mechanism
110 . . . Link plate
111 . . . Connecting pin
112 . . . Connecting hole
113 . . . Engagement pin
114 . . . Protrusion piece insertion groove
115 . . . Guide surface
116 . . . Positioning contact surface
120 . . . Connecting arm
130 . . . Opening/closing arm
131 . . . Auxiliary protrusion piece
132 . . . Locking tongue piece
133 . . . Engagement pin insertion groove
134A . . . Stopper portion
134B . . . Stopper portion
140 . . . Engagement piece
141 . . . Engagement pin insertion groove
142 . . . Locking tongue part
143 . . . Guide piece
C . . . Cable or the like
F . . . Pushing force
F1 . . . Component force
f . . . Sandwiching pressure Although the invention has been described herein by way of particularity, those skilled in the art will readily recognize that changes may be made to the invention without departing from the spirit and scope of the attached claims.

The invention claimed is:

1. A cable protection and guide device including: a plurality of link bodies; said link bodies are flexibly connected to each other; each of said link bodies comprises one link plate and another link plate, a connecting arm, an opening/closing arm and a hinge connecting mechanism; each of said link plates includes a lower edge, an upper edge, an upper end portion, an interior and an exterior; said interiors of said connected link bodies form a hollow space; a cable inserted in said hollow space; said connecting arm connects said lower edges of said link plates to each other; said opening/closing arm connects said upper edges of said link plates to each other; said opening/closing arm has a first and a second end; said hinge connecting mechanism is located at said upper end portion of said one link plate and said hinge connecting mechanism is pivotably interconnected to said first end of said opening/closing arm, said opening/closing arm includes a pivot portion; characterized in that a main locking mechanism disengagably secures said link plates together; said main locking mechanism comprises an engagement pin and an engagement piece; said engagement pin is integrally molded in said upper end portion of said another link plate and extends in the longitudinal direction of said chain; said engagement piece is inserted into said second end of said opening/closing arm; said engagement piece is movable from said outside of said another link plate toward said inside of said another link plate along said opening/closing arm; said engagement piece includes an engagement pin insertion groove, engageable with said engagement pin;

an auxiliary locking mechanism disengageably locks said opening/closing arm and said other link plate; said auxiliary locking mechanism comprises a protrusion piece insertion groove in said another link plate; said opening/closing arm includes an auxiliary protrusion piece; said protrusion piece insertion groove is integrally molded in said another link plate and opens toward said one link plate; said auxiliary protrusion piece is integrally molded on said second end of said opening/closing arm and said auxiliary protrusion piece is engageably inserted in said protrusion piece insertion groove.

2. A cable protection and guide device according to claim 1, characterized in that said another link plate has a guide surface integrally formed in the vicinity of said engagement pin; said auxiliary protrusion piece slides on and is guided by said guide surface to enter said protrusion piece insertion groove.

3. A cable protection and guide device according to claim 1, characterized in that a locking tongue piece is integrally formed in the vicinity of said auxiliary protrusion piece and said locking tongue piece cooperates with said engagement pin insertion groove in said engagement piece to form a closed U-shaped insertion groove structure and hold said engagement pin.

4. A cable protection and guide device according to claim 1, characterized in that said binge connecting mechanism comprises a second engagement pin; said second engagement pin is integrally molded on an upper end portion of said one link plate and extends in the longitudinal direction of said chain; said engagement pin insertion groove is formed on said second end of said opening/closing arm; said opening/closing arm is extended from an inner peripheral side of said another link plate toward an outer peripheral side thereof when said auxiliary locking mechanism is opened and said engagement pin insertion groove is engaged with said engagement pin by retracting said opening/closing arm toward said another link plate.

5. A cable protection and guide device according to claim 1, characterized in that said cable protection and guide device further comprises an elastic deformable locking tongue part; said elastic deformable locking tongue part is integrally molded in said engagement piece; and at least one stopper portion; said stopper portion is integrally molded in said opening/closing arm and locks said locking tongue part; said locking tongue part being locked by one stopper portion to block a movement of said engagement piece when said engagement pin insertion groove of said engagement piece is moved to engage said engagement pin.

6. A cable protection and guide device according to claim 2, characterized in that a locking tongue piece is integrally formed in the vicinity of said auxiliary protrusion piece and said locking tongue piece cooperates with said engagement pin insertion groove in said engagement piece to form a closed U-shaped insertion groove structure and hold said engagement pin.

7. A cable protection and guide device according to claim 2, characterized in that said hinge connecting mechanism comprises a second engagement pin; said engagement pin is integrally molded on an upper end portion of said one link plate and extends in the longitudinal direction of said chain; said engagement pin insertion groove is formed on said second end of said opening/closing arm; said opening/closing arm is extended from an inner peripheral side of said another link plate toward an N outer peripheral side thereof when said auxiliary locking mechanism is opened and said engagement pin insertion groove is engaged with said engagement pin by retracting said opening/closing arm toward said another link plate.

8. A cable protection and guide device according to claim 3, characterized in that said binge connecting mechanism comprises a second engagement pin; said second engagement pin is integrally molded on an upper end portion of said one link plate and extends in the longitudinal direction of said chain; said engagement pin insertion groove is formed on said second end of said opening/closing arm; said opening/closing arm is extended from an inner peripheral side of the another link plate toward an outer peripheral side thereof when said auxiliary locking mechanism is opened and said engagement pin insertion groove is engaged with said engagement pin by retracting said opening/closing arm toward said another link plate.

9. A cable protection and guide device according to claim 2, characterized in that said cable protection and guide device further comprises an elastic deformable locking tongue part; said elastic deformable locking tongue part is integrally molded in said engagement piece; at least one stopper portion; said stopper portion is integrally molded in said opening/closing arm and locks said locking tongue part; said locking tongue pan being locked by one stopper portion to block a movement of said engagement piece when said engagement pin insertion groove of said engagement piece is moved to engage said engagement pin.

10. A cable protection and guide device according to claim 3, characterized in that said cable protection and guide device further comprises an elastic deformable locking tongue part; said elastic deformable locking tongue part is integrally molded in said engagement piece; at least one stopper portion; said stopper portion is integrally molded in said opening/closing arm and locks said locking tongue part; said locking tongue part being locked by one stopper portion to block a movement of said engagement piece when said engagement pin insertion groove of said engagement piece is moved to engage said engagement pin.

11. A cable protection and guide device according to claim 4, characterized in that said cable protection and guide device further comprises an elastic deformable locking tongue part; said elastic deformable locking tongue part is integrally molded in said engagement piece; at least one stopper portion; said stopper portion is integrally molded in said opening/closing arm and locks said locking tongue part; said locking tongue part being locked by one stopper portion to block a movement of said engagement piece when said engagement pin insertion groove of said engagement piece is moved to engage said engagement pin.

12. A cable protection and guide device according to claim 6, characterized in that said hinge connecting mechanism comprises a second engagement pin; said second engagement pin is integrally molded on an upper end portion of said one link plate and extends in the longitudinal direction of said chain; an engagement pin insertion groove is formed on said second end of said opening/closing arm; said opening/closing arm is extended from an inner peripheral side of said another link plate toward an outer peripheral side thereof when said auxiliary locking mechanism is opened and said engagement pin insertion groove is engaged with said engagement pin by retracting said opening/closing arm toward said another link plate.

13. A cable protection and guide device according to claim 6, characterized in that said cable protection and guide device further comprises an elastic deformable locking tongue part; said elastic deformable locking tongue part is integrally molded in said engagement piece; and at least one stopper portion; said stopper portion is integrally molded in said opening/closing arm and locks said locking tongue part; said locking tongue part being locked by one stopper portion to block a movement of said engagement piece when said engagement pin insertion groove of said engagement piece is moved to engage said engagement pin.

14. A cable protection and guide device according to claim 7, characterized in that said cable protection and guide device further comprises an elastic deformable locking tongue part; said elastic deformable locking tongue part is integrally molded in said engagement piece; and at least one stopper portion; said stopper portion is integrally molded in said opening/closing arm and locks said locking tongue part; said locking tongue part being locked by one stopper portion to block a movement of said engagement piece when said engagement pin insertion groove of said engagement piece is moved to engage said engagement pin.

15. A cable protection and guide device according to claim 8, characterized in that said cable protection and guide device further comprises an elastic deformable locking tongue part; said elastic deformable locking tongue part is integrally molded in said engagement piece; and at least one stopper portion; said stopper portion is integrally molded in said opening/closing arm and locks said locking tongue part; said locking tongue part being locked by one stopper portion to block a movement of said engagement piece when said engagement pin insertion groove of said engagement piece is moved to engage said engagement pin.

16. A cable protection and guide device according to claim 12, characterized in that said cable protection and guide device further comprises an elastic deformable locking tongue part; said elastic deformable locking tongue part is integrally molded in said engagement piece; and at least one stopper portion; said stopper portion is integrally molded in said opening/closing arm and locks said locking tongue part; said locking tongue part being locked by one stopper portion to block a movement of said engagement piece when said engagement pin insertion groove of said engagement piece is moved to engage said engagement pin.

* * * * *

UNITED STATES PATENT AND TRADEMARK OFFICE
CERTIFICATE OF CORRECTION

| | |
|---|---|
| PATENT NO. | : 7,249,452 B2 |
| APPLICATION NO. | : 11/499433 |
| DATED | : July 31, 2007 |
| INVENTOR(S) | : Shoichiro Komiya |

It is certified that error appears in the above-identified patent and that said Letters Patent is hereby corrected as shown below:

Column 12, line 32, after "said" delete "binge" and insert -- hinge --.

Column 13, line 3, after "an" delete "N".

Column 13, line 9, after "said" delete "binge" and insert -- hinge --.

Column 13, line 28, after "tongue" delete "pan" and insert -- part --.

Signed and Sealed this

Second Day of October, 2007

JON W. DUDAS
*Director of the United States Patent and Trademark Office*